Nov. 10, 1936.  A. BORBÈLY  2,060,490
ARTICLE OF FOOD-SANDWICH
Filed May 8, 1933
FIG. 1
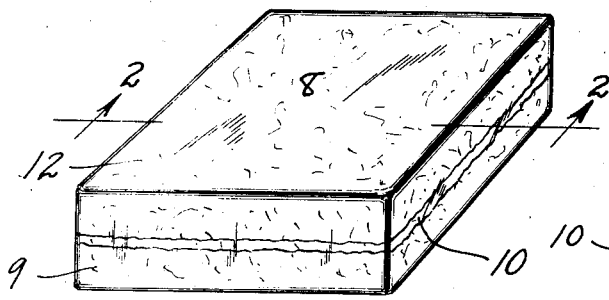
FIG. 2
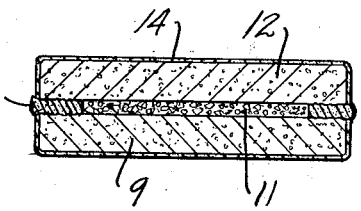
FIG. 3
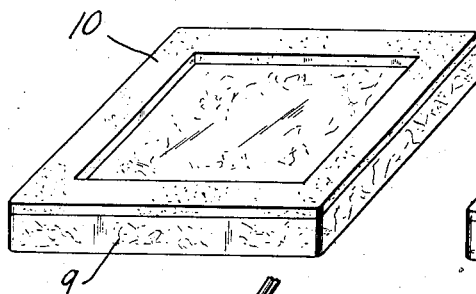
FIG. 4
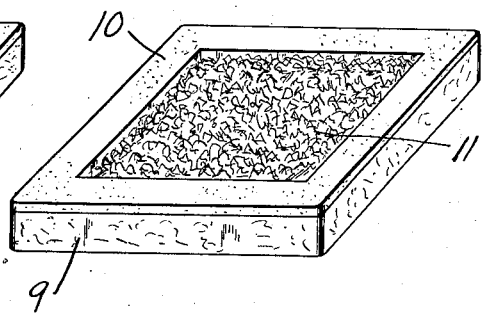
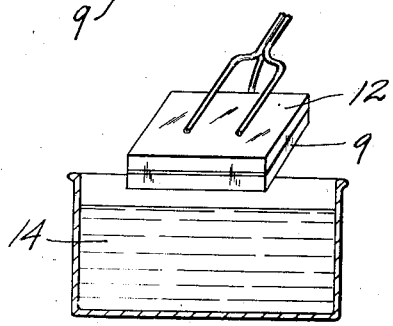
FIG. 5
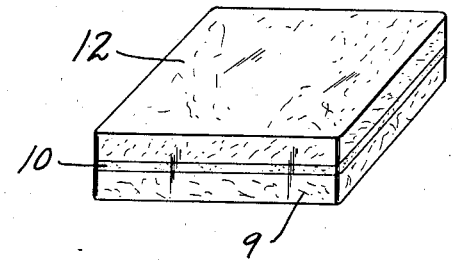
FIG. 6
FIG. 7
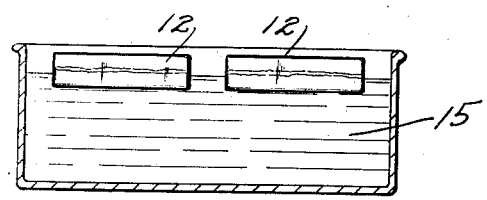
Inventor
Albert Borbely
By Bates, Golrick & Teare
Attorneys Patented Nov. 10, 1936

2,060,490

UNITED STATES PATENT OFFICE 2,060,490

ARTICLE OF FOOD—SANDWICH

Albert Borbèly, Cleveland, Ohio

Application May 8, 1933, Serial No. 669,806

6 Claims. (Cl. 99—86)

This invention is concerned with an article of food, and a novel method of preparing the same, and has, for its general object, the provision of a method for preparing or making sandwiches having a meat, fruit, salad or other filling incorporated therein in such manner that the sandwich will retain its delectability and characteristic of edibility several days after the same has been made.

A further object of my invention is the provision of a novel sandwich structure which will be impervious to the deleterious effect of air exposure.

Other objects of my invention will hereinafter become apparent from the following description, which refers to the accompanying drawing, illustrating the various steps by which I fulfill my novel method of making the article of food. The essential characteristics of the invention are summarized in the claims appended hereto.

My invention contemplates the making of a sandwich by the use of two slices of bread or other food wafers between which I place the sandwich filler after having treated the bread slices or wafers around the edges thereof to cause the filler to be sealed between the bread slices. I thereafter subject the sandwich thus formed to a batter dip and deep fat frying operation, which causes the bread slices, or other food wafers, to be thoroughly sealed together and rendered fit for consumption. To increase the tastiness and appearance of the sandwich, I then subject the same to a browning or toasting operation, whereupon the article of food can then be suitably packed.

In the drawing I show in Fig. 1 the completed article of food, comprising a sandwich 8. Fig. 2 is a cross-section taken through the sandwich structure, substantially along the line 2—2 of Fig. 1. Fig. 3 illustrates the first step of my method of preparing the same, namely, the treating of the slice or layer of bread around the margin of the top surface thereof, while Fig. 4 illustrates the second step of my method, comprising the placing of the sandwich filler. Fig. 5 illustrates the third step comprising the assembly of the sandwich. Fig. 6 illustrates the submission of the assembled sandwich to a batter dip before a deep fat frying operation, while Fig. 7 diagrammatically represents the deep fat boiling operation step of my method of treating the sandwich.

In carrying out my invention, I first prepare an edible sealing paste which I utilize to seal two slices of bread together around the juxtaposed marginal edges thereof, and this sealing paste may comprise a batter proportioned as follows: 1 pound of flour, 2 whole eggs, 1 pint of cream, and 1 ounce of baking powder stirred or mixed to a suitable batter of consistency to permit of its use as a quickly appliable paste. I then apply a band of this paste around the margin of the top surface of a slice of bread, the width of the applied paste being about three-eighths of an inch, the applied paste being indicated at 10 on the top surface of the slice of bread 9 in Fig. 3.

As shown in Fig. 4, I then apply the sandwich filler 11, which may comprise creamed chicken, meats of various kinds, cheese or cheese combinations, fruit, jelly or salad, as desired.

I then apply the top layer or slice of bread 12 to the lower slice 9 and firmly press the two slices of bread together to cause the paste band 10 to seal the two layers of bread together.

The next step in my method of treating the sandwich comprises submerging the sandwich in a batter 14 comprising 12 eggs, ½ pound of flour, 28 ounces of milk, 3 ounces of butter and a pinch of salt, as indicated diagrammatically in Fig. 6, and this dipping action should be of sufficient duration to permit the batter to soak slightly into the exposed surfaces of the two slices of bread to fill the outer exposed pores of the bread.

I then subject the batter dipped sandwich to the deep fat boiling or frying by the use of any suitable cooking oil, such as vegetable oil or boiling grease 15, for a short period of time to cause the batter and sealing past to be cooked to an edible condition. If desired, the deep fat boiled sandwich can then be submitted to a browning operation in a suitable toaster or broiler and then packaged for merchandising, or, if desired, the sandwich need not be browned if it is intended for home consumption and this browning operation can be effected by the purchaser. The sandwich can then be served in a heated condition.

If the sandwich is browned before sale, I find it can thereafter be heated in an ordinary steam heated dry boiler or broiled.

I have found that sandwiches made in accordance with the foregoing method will retain their flavor over a period of several days. The filler will not deteriorate in any manner, such as would render the sandwich unfit for consumption. The sandwich can be sold cold and consumed while cold. No annoying crumbs result from its consumption. It can be packaged very readily in a transparent package without resultant grease spot stains, and it has the advantage of convenience in sanitary handling and packaging and merchandising, while remaining appetizing in appearance.

I claim:

1. The method of preparing a sandwich, which comprises mixing an edible food batter which will serve as a paste to seal two layers of bread together, treating one layer of bread around the edges of one surface thereof with said paste to form an upstanding bead thereon, applying a sandwich filler over the untreated surface of the bread and within the confines of said bead, then applying a second layer of bread to the first layer, then dipping the sandwich thus assembled in a food batter to cause the sealing of the exposed pores of the bread, submitting the dipped sandwich to a deep fat boiling operation and thereafter browning the sandwich by a toasting or broiling operation.

2. The method of preparing a sandwich, which comprises treating one layer of bread around the edges of one surface thereof with a batter paste to form a raised marginal band thereon, applying a sandwich filler over the untreated surface of the bread and within the confines of said band, then applying a second layer of bread to said band, then applying to the sandwich while thus assembled a food batter to cause the sealing of the exposed pores of the bread, and submitting the dipped sandwich to a deep fat boiling operation.

3. The method of preparing a sandwich, which comprises mixing an edible food batter, comprising flour, eggs, cream and baking powder to a consistency of a paste to seal two layers of bread together, treating one layer of bread around the edges of one surface thereof with said paste, applying the sandwich filler over the untreated surface of the bread, then applying a second layer of bread to the first layer, then applying to the sandwich while thus assembled a food batter to cause the sealing of the exposed pores of the bread and submitting the batter coated sandwich to a deep fat boiling operation and thereafter browning the sandwich by a toasting or broiling operation.

4. The method of preparing an article of food, which comprises mixing an edible food batter which will serve as a paste to seal two layers of previously baked food together, treating one layer of the baked food around the edges of one surface thereof with said paste, applying a sandwich filler over said surface of the layer of previously baked food, then applying a second layer of the baked food to the first layer, then applying to the outer surfaces of the sandwich thus assembled a food batter to cause the sealing of the exposed pores of the layers of previously baked food, and submitting the coated sandwich to a deep fat cooking operation.

5. As an article of food, a sandwich comprising a lower and an upper layer of bread or equivalent food wafers, having an edible sealing paste marginal band joining two juxtaposed surfaces of the layers to each other around the edges thereof with their adjacent surfaces spaced apart by said band and having a layer of sandwich food disposed between the paste layer and the bread layer, and a batter coating enclosing the bread layers to seal the pores thereof and to prevent the ingress of air to the sandwich layer or filler, said batter casing having been reduced to a condition of edibility by a cooking operation.

6. As an article of food, a sandwich comprising a lower and an upper layer of bread, having an edible sealing paste joining the two juxtaposed surfaces of the bread layers to each other around the edges thereof and spaced apart in the center thereof and a layer of sandwich food disposed between the bread layers, and confined within the sandwich by said marginal band the sandwich having a cooked batter coating enclosing the bread layers to seal the pores thereof and to prevent the ingress of air to the sandwich layer or filler.

ALBERT BORBÉLY.